3,784,704
COMPOSITIONS OF 4-BIPHENYL ACETIC ACID AND METHOD OF USE

Elliott Cohen, Pearl River, Adolph Edward Sloboda, New City, and Arnold Curtis Osterberg and Ralph Grassing Child, Pearl River, N.Y., assignors to American Cyanamid Company, Stamford, Conn.
No Drawing. Filed Oct. 13, 1972, Ser. No. 297,540
Int. Cl. A61k 27/00
U.S. Cl. 424—317                4 Claims

ABSTRACT OF THE DISCLOSURE

The compound 4-biphenylacetic acid, its use and method of preparation is described. It is useful for the long lasting amelioration of pain in warm-blooded animals.

PRIOR ART

Substituted 4-biphenylacetic acids are described, for example, in Eire Pat. 56/65, Belgian Pat. 664,187 (11/19/65), South African Pat. 65/4206 (3/10/66), French Pat. 2401M (4/13/64). These references describe a variety of uses for the substituted 4-biphenylacetic acids. Esters of biphenylacetic acid are described by F. Blicke et al. (J. Am. Chem. Soc. 65, 1725 (1943) as antispasmodics although the base compound is not indicated as having any activity. G. Cavallini et al. (II Farmaco Ed. Scient II, 167 (1956) describe a number of substituted biphenylacetic acids as having anti-cholesterolemic activity. Other references such as British Pat. 034,534 (1/14/71) and T. Y. Shen, Chim. Ther. 2 (3) 459 (1957) describe a number of substituted biphenylacetic acids as anti-inflammatory agents.

DESCRIPTION OF THE INVENTION

This invention relates to the administration in the form of compositions of matter or method of use of a therapeutically effective amount of 4-biphenylacetic acid of the formula:

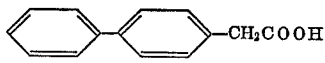

and a pharmaceutically acceptable carrier.

The preparation of the active component of the present compositions is described in the chemical literature by F. Blicke et al. J. Am. Chem. Soc., 65, 1725 (1943).

The 4-biphenylacetic acid has been found useful as a long lasting drug for the amelioration of pain in warm-blooded animals in doses which range from about 0.5 to 250 mg./kg./day. The preferred range of dose is usually from 5 to 50 mg./kg./day. In terms of drug per dosage unit for internal administration, one or more at intervals of one or several times a day may vary from about 50 mg. to about 500 mg. of therapeutic component. The present compound can also be used parenterally or topically and formulations for such use are described hereinafter. Among the warm-blooded animals may be, for example, mice, rats, guinea pigs, dogs and the like.

One method of determining the drug effect on conditions which result in production of pain is measuring the effect of acute inflammation in said warm-blooded animal. The following experiment using Royal Hart, Wistar strain rats ranging from 80 to 90 g. was carried out. The rats were fasted overnight prior to dosing but had free access to water. The drugs in aqueous suspension were administered by gavage in a volume of 1.7 ml./50 g. rat (corresponds to hydration volume used by Winter et al., Proc. Soc. Exp. Biol. & Med. 111 544–547, 1962). The phlogistic agent used was carrageenin prepared as a sterile 1% suspension in 0.9% sodium chloride for routine testing. A volume of 0.05 ml. was injected through a 26-gauge needle into the plantar tissue of the right hind paw. Measurements were made 5 hours after drug administration (4 hours after carrageenin challenge) unless otherwise indicated. Volumes of both the normal and carrageenin inflamed feet were determined. The difference between the two measurements was considered to be the increased edema due to the carrageenin administration. Results were expressed as a C/T efficacy ratio (edema of control animals/edema of treated animals). The following Table I summarizes the results. A compound is considered active if the C/T ratio >1.4.

TABLE I
The effects of anti-inflammatory agents on carrageenin induced edema of the rat paw (pooled data)

| | Dose, mg./kg. | Number rats | Ratio control/ treated edema |
|---|---|---|---|
| Controls | | 64 | |
| Aspirin | 250 | 32 | [1] 2.8 |
| | 83 | 32 | [1] 1.4 |
| | 27 | 32 | 1.2 |
| | 9 | 32 | 0.9 |
| | 3 | 32 | 1.0 |
| Phenylbutazone | 250 | 32 | [1] 2.3 |
| | 83 | 32 | [1] 2.4 |
| | 27 | 32 | [1] 1.7 |
| | 9 | 32 | 1.3 |
| | 3 | 32 | 1.3 |
| 4-biphenylacetic acid | 250 | 12 | [1] 1.7 |
| | 83 | 12 | [1] 1.9 |
| | 27 | 12 | [1] 1.5 |

[1] Differs significantly from controls ($p = <0.05$ by $t$ test).

Another method of determining pain alleviation of the compound of the present invention is its effect as an active analgesic when measured by the "writhing syndrome" test for analgesic activity as described by Hendershot, L. C. and Forsaith, J. Journal of Pharmacology and Experimental Therapeutics, vol. 125, pages 237–240 (1958) with modifications. This method is based upon the reduction of the number of writhes following the intraperitoneal injection of one mg./kg. of body weight of phenyl p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl p-quinone. The test compound is administered orally to groups of two mice each 30 minutes before injection of the phenyl p-quinone.

The total number of writhes exhibited by each group of mice is recorded for a 3-minute period commencing 15 minutes after injection of the phenyl p-quinone. A compound is considered active if it reduces the total number of writhes in two test mice from a control value of approximately 30 per pair to a value of 10 or less.

The following Table II summarizes the relative activity of the component of the present invention along with the activity of well known analgesics in this test.

TABLE II

| Compound | Oral dosage, mg./kg. | Number of writhes per 3 min. period | |
|---|---|---|---|
| | | Pair 1 | Pair 2 |
| Aspirin [1] | 200 | 3 | 3 |
| Phenylbutazone [1] | 200 | 5 | 5 |
| 4-biphenylacetic acid | 100 | 5 | 3 |
| Controls [1] | | 30 | 30 |

[1] Data for controls, aspirin, and phenylbutazone are historical averages using many pairs of animals.

Another method of determining the drug effect on conditions which result in production of pain is measuring the effect on ultraviolet induced erythema in guinea pigs. Albina guinea pigs. (Lederle breeding colony) were depilitated on their flanks, the evening before testing, with a standard mixture of barium sulfide and gum acacia. On the morning of testing, groups of four guinea were dosed by gavage one hour prior to ultraviolet exposure (—1 hour.). At 0-hour they were restrained in a plastic container which allows exposure of 3 circular spots. They were then exposed to ultraviolet irradiation from a "Hanovia" Kromayer lamp model 10 for 60 seconds. To test for topical activity, the guinea pigs were tested immediately after exposure to ultraviolet light by dissolving the said compound in ethyl alcohol and swabbing the U.V. exposed areas with the aid of a cotton tipped applicator stick. At +1 and +4 hours, the degree of erythema for each of the three sites was assessed according to the following scoring system: 0=no erythema, 0.5 incomplete circle or faint erythema and 1.0=complete circle of distinct erythema. Thus, the maximum score for each animal was 3.0. The following Tables III, IV and V summarize the results of the present compound and other drugs known to have a beneficial effect in erythema in warmblooded animals.

TABLE III

The effect of anti-inflammatory agents on development of erythema in guinea pigs (pooled data)

| Treatment | Dose,[1] mg./kg. | Score (avg.) | | Dead G.P./ total | Decision |
|---|---|---|---|---|---|
| | | 1 hr. | 4 hrs. | | |
| Control | | 2.1 | 2.8 | 4/384 | |
| Aspirin | 250 | 0.1 | 1.2 | 7/88 | A |
| | 125 | 0.1 | 2.0 | 0/16 | A |
| | 62.5 | 0.8 | 2.0 | 2/11 | A |
| | 31.3 | 1.2 | 2.3 | 0/12 | |
| Phenylbutazone | 250 | 0 | 0.5 | 2/00 | A |
| | 125 | 0.1 | 1.1 | 0/16 | A |
| | 62.5 | 0.3 | 0.9 | 1/12 | A |
| | 31.3 | 0.4 | 1.7 | 1/12 | A |
| | 15.6 | 0.4 | 2.3 | 0/8 | A |
| | 7.8 | 1.1 | 2.9 | 0/8 | |
| 4-biphenylacetic acid | 250 | 0.1 | 2.6 | 0/8 | A |
| | 125 | 0.1 | 2.1 | 0/8 | A |
| | 62.5 | 0.1 | 1.6 | 1/8 | A |
| | 31.3 | 0.2 | 1.3 | 0/8 | A |
| | 15.6 | 0.1 | 1.9 | 0/8 | A |
| | 7.8 | 0.4 | 2.4 | 0/8 | A |
| | 3.9 | 0.1 | 2.3 | 0/8 | A |
| | 1.95 | 1.2 | 2.7 | 0/8 | |

[1] Oral administration.

Note.—A=Active (discriminant function analysis).

TABLE IV

The effect of varying the time pretreatment with various anti-inflammatory drugs on development of UV induced erythema of guinea pigs (observation 1 hour after UV exposure)

| Treatment | Oral dose, mg./kg. | Erythema score obtained at various times of drug penetration | | | | |
|---|---|---|---|---|---|---|
| | | —1 hr.[1] | —18 hrs.[2] | —42 hrs.[3] | —66 hrs.[3] | —90 hrs.[3] |
| Control | | 2.1 | 2.2 | 2.8 | 2.8 | 2.8 |
| Aspirin | 250 | [4]0.1 | 1.2 | 2.3 | 2.6 | 2.6 |
| Phenylbutazone | 250 | [4]0 | [4]0 | 1.5 | 2.5 | |
| | 125 | [4]0.1 | [4]0.6 | 2.1 | | |
| | 63 | [4]0.3 | 2.0 | | | |
| | 31 | [4]0.4 | 2.4 | | | |
| | 16 | [4]0.4 | 2.1 | | | |
| | 8 | 1.1 | 2.8 | | | |
| 4-biphenylacetic acid. | 250 | [4]0.1 | | | | |
| | 125 | [4]0.1 | | | [4]0.1 | [4]0 |
| | 63 | [4]0.1 | | | [4]0.3 | [4]0.1 |
| | 31 | [4]0.2 | | | [4]0.1 | 1.9 |
| | 16 | [4]0.1 | | | 1.1 | 2.5 |

[1] 1 hr. data from Table III.
[2] 16 control guinea pigs and 8 in each treated group.
[3] 8 control guinea pigs and 4 in each treated group.
[4] Statistically significant activity (discriminant function analysis).

TABLE V

The effect of topically applied biphenylacetic acid on development of erythema in guinea pigs (pooled data)

| Treatment | Conc. of applied solution, mg./ml. | Estimated dose, mg. | Score (avg.) | | Dead G.P./ total | Decision |
|---|---|---|---|---|---|---|
| | | | 1 hr. | 4 hr. | | |
| Control | | | 2.4 | 3.0 | 0/24 | |
| 4-biphenylacetic acid | 10 | 1.70 | .3 | 2.3 | 0/16 | A |
| | 5 | .85 | .9 | 2.8 | 0/8 | |
| | 2.5 | .43 | 1.4 | 2.6 | 0/8 | |

Note.—A=Active (discriminant function analysis).

Tests to show the effect of said drug on chronic conditions of inflammation which produce severe pain were carried out in rats with adjuvant induced arthritis. Groups of three Royal Hart Wistar strain rats, weighing 200±10 g. each were injected intradermally in the right hind paw with Freund's adjuvant (dried human tubercle bacilli in a mineral oil vehicle) at a dose of 2 mg./kg. of body weight. Test compound was administered orally in a 1.5% starch vehicle at the indicated dosage in mg./kg. of body weight once daily on days 0 through 13 post-challenge. Control rats were treated in a similar manner, but given starch vehicle instead of the test compound. On the 14th and 21st day post-challenge the diameter of the injected paw (primary lesion) is measured by micrometer caliper, the volumes of inflamed paws are estimated from these measurements, and the results are expressed as percent inhibition of swelling as compared to controls at the same time. The other inflamed sites, such as ears, paws and tail (secondary lesions) are observed and the rat graded as to degree of inflammation and swelling present. The grading is based on a scale of 0 to 24.0, where 0 represents a complete absence of induced arthritic modules and 24.0 represents the maximum degree of inflammation. The mean grade for each treated group is calculated and the effects of each compound were expressed as percent inhibition of the control grade. The following Table VI summarizes the results obtained with 4-biphenylacetic acid and known anti-inflammatory agents.

TABLE VII

Ratio of treated/control pressure-pain threshold

| Hours after treatment: | Aspirin | Phenyl-butazone | 4-biphenyl-acetic acid |
|---|---|---|---|
| ½ | | 1.9 | |
| 1 | 1.2 | 2.8 | |
| 2 | 1.2 | 2.6 | 2.7 |
| 3 | 1.7 | 3.2 | |
| 4 | 1.7 | 3.2 | 2.5 |
| 6 | 1.1 | 1.1 | |
| 8 | | | 2.3 |
| 18 | | | |
| 24 | | | 1.5 |

NOTE.—Analgesic action (duration) in the inflamed (brewers' yeast) rat paw. Analgesia is considered to be present when the T/C ratio ≥1.5. There were at least 8 rats tested for each time period.

The prolonged activity of 4-biphenylacetic acid over aspirin and phenylbutazone is shown in the above Table VII.

The following tests were used to show the effects of biphenyl acetic acid on the alleviation of pain and inflammation caused by sodium urate induced synovitis in dogs.

Synthetic monosodium urate crystals were prepared by

TABLE VI

The effect of anti-inflammatory agents on adjuvant arthritis of rats (treatment day 0 to 13)

| Treatment | Oral dose, mg./kg./day | Dead/treated at 21 days | Mean weight gain (gms.) Day 14 | Mean weight gain (gms.) Day 21 | Percent inhibition of swelling (primary lesion) Day 14 | Percent inhibition of swelling (primary lesion) Day 21 | Percent inhibition of score (secondary lesion) Day 14 | Percent inhibition of score (secondary lesion) Day 21 |
|---|---|---|---|---|---|---|---|---|
| Normal rats | | 4/51 | [1] 69 | [1] 100 | | | | |
| Adjuvant controls | | 21/234 | 36 | 39 | 0 | 0 | 0 | 0 |
| Phenylbutazone | 150 | 0/18 | 45 | 50 | [1] 80 | 44 | [1] 52 | [1] 31 |
|  | 75 | 2/18 | [1] 57 | 54 | [1] 72 | [1] 23 | [1] 24 | 11 |
|  | 37.5 | 2/18 | 47 | 50 | [1] 67 | 19 | 12 | [1] 14 |
| Aspirin | 400 | 4/18 | 48 | 57 | [1] 76 | [1] 68 | [1] 52 | [1] 48 |
|  | 200 | 1/18 | 31 | 27 | [1] 51 | [1] 36 | 14 | [1] 18 |
|  | 100 | 7/18 | 42 | 49 | [1] 40 | [1] 21 | [1] 19 | 7 |
| 4-biphenylacetic acid | 25 | 6/27 | 37 | 44 | [1] 55 | [1] 44 | [1] 27 | 2 |
|  | 12.5 | 2/6 | 53 | 37 | [1] 35 | 8 | [1] 35 | 0 |
|  | 6.3 | 2/6 | 40 | 26 | 23 | 4 | 15 | 18 |

[1] Significantly different from adjuvant controls (p=<0.05 by t test).

Experiments were conducted to determine analgesia by a modification of the method of Randall and Selitto (Arch. Int. Pharmacodyn. 111: 409–419, 1957) in rats whose paws were made sensitive to pressure by the injection of a 20% aqueous suspension (0.1 ml.) of brewers' yeast into the plantar surface of the left hind jaw. Constantly increasing force (16 grams/second) was applied to the swollen paw using an Analgesy Meter, Ugo Basile. The pressure was cut off at 250 grams of force when there was no response (sudden struggle or vocalization). Control rats treated with the starch vehicle respond to a pressure or force of about 30 grams. Pressure-pain thresholds were always recorded two hours after brewers' yeast. Analgesic agents were administered at various times before or after the yeast depending on the duration of action being studied. Ratios of treated (T)/control (C) reaction thresholds were calculated as estimates of analgesic efficacy (degree of analgesia attainable). The ratios of pressure to react were determined from ½ to 24 hours following the administration of 200 mg./kg. orally of 4-biphenylacetic acid, aspirin or phenylbutazone. The results are summarized in Table VII.

reacting a hot sodium hydroxide solution with uric acid crystals overnight according to the method described by McCarty, O. J., Jr. and Faires, J. S., Current Therapeutic Research 5, 284–290 (1963). The resultant monosodium urate crystals were washed and dried and resuspended in physiological saline to a concentration of 30 mg./ml. and sterilized by autoclaving. Suspensions of sodium urate crystals prepared in this fashion can be stored indefinitely.

Beagles from the Lederle colony were used in all experiments. They were housed in individual cages and kept under uniform conditions ad libitum feeding (Ken-L Ration), temperature, humidity and artificial lighting.

The dogs were lightly restrained and taught to lie quietly in dog cradle on their backs. To produce the synovitis, the knee was shaved and a sterile 20 gauge needle inserted into the knee (stifle) joint. The needle was left in place and a syringe containing the 30 mg./ml. sodium urate crystal suspension was attached. A volume of 0.1 ml. (3 mg. of sodium urate crystals) was then injected. An interval of at least 14 days elapsed between each use of a dog. The knees were alternated: thus each dog was used twice a month but each knee only once a month.

The degree of inflammation produced by the sodium urate injection was evaluated according to the following scoring system:

0—Normal
1—Knee tender
2—Limp
3—Occasional three-legged gait
4—Three-legged gait Drugs were administered orally by capsule or injected directly into the knee joint. Dogs were observed at hourly intervals for seven hours.

The following Tables VIII and IX summarize the results obtained.

TABLE VIII

The effect of biphenylacetic acid given 1 hour prior to challenge on the production of sodium urate induced synovitis in dogs (pooled data)

| Oral treatment | Dose (mg./kg.) | Number dogs | Mean score indicating severity of synovitis at various times (hrs.) after challenge | | | | | | |
|---|---|---|---|---|---|---|---|---|---|
| | | | 1 hr. | 2 hr. | 3 hr. | 4 hr. | 5 hr. | 6 hr. | 7 hr. |
| Control | | 31 | 1.2 | 3.7 | 4.0 | 3.8 | 3.9 | 3.9 | 3.7 |
| 4-biphenylacetic acid | 50 | 4 | ¹0 | ¹0 | ¹0 | ¹0 | ¹0 | ¹0 | ¹0 |
| Do | 25 | 8 | ¹0 | ¹.3 | 1.7 | ¹1.1 | 1.7 | 1.5 | 1.4 |
| Do | 12.5 | 7 | ¹0 | 1.4 | 1.5 | 1.5 | 1.4 | 1.4 | ¹.3 |
| Do | 6.25 | 4 | ¹0 | ¹0 | 1.3 | ¹0 | ¹0 | ¹0 | ¹0 |
| Do | 3.1 | 3 | ¹0 | ¹1.3 | 2.3 | 2.7 | 2.0 | 2.0 | 2.0 |

¹ Statistically significant suppression of synovitis ($p = <.05$).

TABLE IX

The effect of local intrasynovial injections of biphenylacetic acid on production of sodium urate induced synovitis in dogs (pooled data)

| Intralesional treatment | Total dose injected into joint (mg.) | Number dogs | Mean score indicating severity of synovitis at various times (hrs.) after challenge | | | | | | |
|---|---|---|---|---|---|---|---|---|---|
| | | | 1 hr. | 2 hr. | 3 hr. | 4 hr. | 5 hr. | 6 hr. | 7 hr. |
| Control | | 31 | 1.2 | 3.7 | 4.0 | 3.8 | 3.9 | 3.9 | 3.7 |
| 4-biphenylacetic acid | 10 | 2 | 0 | ¹0 | ¹.5 | ¹1.0 | ¹1.0 | 2.0 | ¹1.5 |
| Do | 5 | 8 | 0 | ¹.5 | ¹2.3 | ¹2.0 | ¹1.8 | ¹1.8 | ¹2.1 |

¹ Statistically significant suppression of synovitis ($p = <.05$).

The pharmaceutical carriers of the present invention may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule or a liquid suspension.

SPECIFIC EXAMPLES

The following examples describe in detail formulations which can be used in administering compositions of 4-biphenylacetic acid.

EXAMPLE 1

Ingredients: Grams
    4-biphenylacetic acid _____ 10.0
    Magnesium stearate _____ 0.2
    Lactose _____ 12.0

Screen above ingredients through a No. 40 mesh screen. Transfer to mixer and mix well. Place in 100 hard gelatin capsules. Each capsule contains a dose of 100 mg. which may be taken several times a day.

EXAMPLE 2

Ingredients: Grams
    4-biphenylacetic acid _____ 50.0
    Peanut oil _____ 112.5

Mix above ingredients to a thick slurry and fill into 1,000 soft gelatin capsules. Each capsule contains a dose of 50 mg. of drug.

EXAMPLE 3

Ingredients: Grams
    4-biphenylacetic acid _____ 75.0
    Talc _____ 75.0
    Magnesium stearate _____ 2.5

The ingredients are mixed, screened and tableted to give 500 tablets of 150 mg. each of 4-biphenylacetic acid.

EXAMPLE 4

Preparation of parenteral solution

In a solution of 700 ml. of propylene glycol and 200 ml. of water for injection is dissolved 20.0 g. of 4-biphenylacetic acid with stirring. After dissolution is complete, a solution of 5 g. of 2-aminoethanol in 20 ml. of water for injection is then added to the formulation. The pH of this solution is then adjusted to 5.5 with hydrochloric acid and the volume is made up to 1000 ml. with distilled water. The formulation is filtered through a 0.22 micron sterilizing filter, filled into 5.0 ml. ampoules each containing 2.0 ml. (representing 40 mg. of drug) and sealed under nitrogen.

EXAMPLE 5

Topical preparation 4-biphenylacetic acid _____ g__ 1.0
Ethanol _____ cc__ 5.0
Methyl salicylate _____ cc__ 5.0
Squalane _____ cc__ 90.0

The ingredients are mixed together and used on intact skin.

What is claimed is:

1. The method for producing long lasting amelioration of pain in a warm blooded animal which comprises administering internally or topically to said animal an amount effective to produce a long lasting anti-pain effect of 4-biphenylacetic acid in association with a pharmaceutically acceptable carrier.

2. The method in accordance with claim 1, in the form of a capsule.

3. The method in accordance with claim 1, in the form of a tablet.

4. The method in accordance with claim 1, in the form of a topical preparation.

References Cited

Blicke et al., J. Am. Chem. Soc., 65, 1725–1728 (1943).

STANLEY J. FRIEDMAN, Primary Examiner